(12) United States Patent
Garrett et al.

(10) Patent No.: US 10,643,494 B2
(45) Date of Patent: May 5, 2020

(54) CUBE PUZZLE SOLVER

(71) Applicants: David Garrett, Tustin, CA (US); Mehdi Hatamian, Mission Viejo, CA (US)

(72) Inventors: David Garrett, Tustin, CA (US); Mehdi Hatamian, Mission Viejo, CA (US)

(73) Assignee: 22nd Solutions, LLC, Newport Beach, CA (US)

( * ) Notice: Subject to any disclaimer, the term of this patent is extended or adjusted under 35 U.S.C. 154(b) by 0 days.

(21) Appl. No.: 16/099,833

(22) PCT Filed: Nov. 22, 2017

(86) PCT No.: PCT/US2017/063114
§ 371 (c)(1),
(2) Date: Nov. 8, 2018

(87) PCT Pub. No.: WO2018/098351
PCT Pub. Date: May 31, 2018

(65) Prior Publication Data
US 2019/0114944 A1    Apr. 18, 2019

Related U.S. Application Data

(60) Provisional application No. 62/426,169, filed on Nov. 23, 2016.

(51) Int. Cl.
*G09B 19/22* (2006.01)
*A63F 9/08* (2006.01)
(Continued)

(52) U.S. Cl.
CPC ............ *G09B 19/22* (2013.01); *A63F 9/0842* (2013.01); *A63F 13/00* (2013.01); *A63F 13/335* (2014.09);
(Continued)

(58) Field of Classification Search
CPC ............ A63F 13/213; A63F 2009/2442; A63F 2009/2454; A63F 9/0826; G09B 19/22
See application file for complete search history.

(56) References Cited

U.S. PATENT DOCUMENTS

2008/0237981 A1    10/2008    Gilles et al.
2011/0248443 A1    10/2011    Artsiely
(Continued)

FOREIGN PATENT DOCUMENTS

CN    108525283 A    9/2018
CN    108568089 A    9/2018
(Continued)

*Primary Examiner* — Jerry-Daryl Fletcher
(74) *Attorney, Agent, or Firm* — Genius Patent APC; Bruce Hare

(57) ABSTRACT

A cube puzzle solver includes: a position sensing element; at least one user interface (UI) output; and a controller that receives position information from the position sensing element, determines a suggested move, and directs the at least one UI output to provide an indication associated with the suggested move. An automated method of determining a position of a cube puzzle solver includes: monitoring a set of sense pins; identifying rotation based on a change in state of at least one sense pin; identifying a face associated with the identified rotation; and updating a state of the cube puzzle solver based on the identified face and the identified rotation. A cube puzzle system includes: a cube puzzle device including: a wireless communication interface; and a user device communicatively coupled to the cube puzzle solver over the wireless communication interface.

23 Claims, 14 Drawing Sheets

(51) Int. Cl.
  *A63F 13/00* (2014.01)
  *A63F 9/24* (2006.01)
  *A63F 13/335* (2014.01)
  *A63F 13/5375* (2014.01)

(52) U.S. Cl.
  CPC .. *A63F 13/5375* (2014.09); *A63F 2009/2442* (2013.01); *A63F 2009/2454* (2013.01)

(56) References Cited

U.S. PATENT DOCUMENTS

| | | |
|---|---|---|
| 2012/0184341 A1 | 7/2012 | Dai et al. |
| 2013/0005420 A1 | 1/2013 | Ueno et al. |
| 2014/0077454 A1* | 3/2014 | Lapstun ................ A63F 13/005 273/153 S |

FOREIGN PATENT DOCUMENTS

| | | |
|---|---|---|
| CN | 207853515 U | 9/2018 |
| CN | 207853516 U | 9/2018 |
| KR | 1020080083569 A | 9/2008 |
| KR | 1020110009974 A | 1/2011 |
| WO | 2018028064 A1 | 2/2018 |
| WO | 2018138586 A2 | 8/2018 |

* cited by examiner

| FACE | CW | CCW |
|---|---|---|
| F0 | z0zz1 | z1zz0 |
| F1 | z0z1z | z1z0z |
| F2 | z01zz | z10zz |
| F3 | 0zzz1 | 1zzz0 |
| F4 | 0zz1z | 1zz0z |
| F5 | 0z1zz | 1z0zz |

US 10,643,494 B2

CUBE PUZZLE SOLVER

CROSS-REFERENCE TO RELATED APPLICATIONS

This application is a National Stage entry of Patent Application serial number PCT/US2017/063114, filed on Nov. 22, 2017. Patent Application serial number PCT/US2017/063114 claims priority to the U.S. Provisional Patent Application Ser. No. 62/426,169, filed on Nov. 23, 2016.

BACKGROUND

Many people may enjoy attempting to solve various puzzles. In particular, cube-type puzzles are a particular category.

Many users of such puzzles may not be able to solve the puzzles or may desire to learn additional moves or strategies. Current teaching tools do not allow for a user to receive feedback at the puzzle itself.

In addition, many users may want to compete with others or share results across social media. Current puzzles are not able to communicate with user devices such as smartphones, and thus lack the capability to allow users to easily interact.

Thus there is a need for a cube puzzle solver that is able to indicate steps toward a solution and interact with various user devices.

SUMMARY

Some embodiments provide a cube puzzle solver device. Such a device may have six sides, each side having a number of sub-elements (e.g., nine sub-elements, sixteen sub-elements, etc.). Each side may be able to be rotated about an axis such that the orientation of the sub-elements is changed relative to other sides of the cube (e.g., by rotating a face clockwise by ninety degrees, one hundred eighty degrees, two hundred seventy degrees, etc.). In addition to changing the orientation of the face of the sub-elements associated with the rotated face, other sub-elements may be moved so as to be associated with a different side. For instance, corner sub-elements of the cube may be associated with three faces of the cube where movement of a particular face may cause one or more faces of each sub-element to be associated with a different side.

A cube puzzle may have square sides and square sub-elements. Different embodiments may utilize various appropriate shapes and arrangements (e.g., spheres, circles, triangles, pyramids, etc.) but will be referred to as "cube puzzles" throughout the specification. The cube puzzle may be in a "solved" state when the sub-elements of each side all match. Such matching may include, for instance, matching colors, graphical indicators (e.g., shapes, icons, letters, numbers, etc.), textures, etc. In some embodiments a user may be able to define a target state that is different than the default solved state. For instance, a user may arrange the sub-elements in a particular pattern (with or without directions from the solver) and then may set that state as the desired target, starting, or solution state.

One of ordinary skill in the art will recognize that the specific attributes of the cube puzzle may vary among different embodiments depending upon various relevant parameters (e.g., shape of the puzzle, number of faces, number of sub-elements, etc.).

The cube puzzle solver device may include various position sensing elements. Such elements may be able to identify rotation of each face of the puzzle. The position sensing elements may include relative and absolute position sensing.

The cube puzzle solver device may utilize the position sensing elements to determine (and/or update) a current state of the puzzle. The current state may be utilized to generate a solution to achieve target state. The solution may be presented to a user via various UI elements of the device (e.g., arrows indicating a rotation direction for each face). Such solution steps may be presented when a user requests instruction. Some embodiments may automatically determine when a solution has been achieved by comparing a current state of the device to the target state.

Some embodiments may allow communication with external user devices (e.g., smartphones, tablets, etc.). Such user devices may execute an application of some embodiments that is able to provide instructions to users, receive a state of the puzzle, share results across various platforms, and/or perform other appropriate tasks.

The preceding Summary is intended to serve as a brief introduction to various features of some exemplary embodiments. Other embodiments may be implemented in other specific forms without departing from the scope of the disclosure.

BRIEF DESCRIPTION OF THE SEVERAL VIEWS OF THE DRAWINGS

The exemplary features of the disclosure are set forth in the appended claims. However, for purpose of explanation, several embodiments are illustrated in the following drawings.

DETAILED DESCRIPTION

The following detailed description describes currently contemplated modes of carrying out exemplary embodiments. The description is not to be taken in a limiting sense, but is made merely for the purpose of illustrating the general principles of some embodiments, as the scope of the disclosure is best defined by the appended claims.

Various features are described below that can each be used independently of one another or in combination with other features. Broadly, some embodiments generally provide a cube puzzle solver.

A first exemplary embodiment provides a cube puzzle solver comprising: at least one position sensing element; at least one UI output; and a controller that receives position information from the at least one position sensing element, determines a suggested move, and directs the at least one UI output to provide an indication associated with the suggested move.

A second exemplary embodiment provides an automated method of determining a position of a cube puzzle solver, the method comprising: monitoring a set of sense pins; identifying rotation based on a change in state of at least one sense pin in the set of sense pins; identifying a face of the cube puzzle solver associated with the identified rotation; and updating a state of the cube puzzle solver based on the identified face and the identified rotation.

A third exemplary embodiment provides a cube puzzle system comprising: a cube puzzle device comprising: a set of position sensing elements able to detect rotation of each face of the cube puzzle device; and a wireless communication interface; and a user device communicatively coupled to the cube puzzle solver over the wireless communication interface, the user device comprising: at least one UI element that is able to provide step-by-step instructions to solve the cube puzzle device.

Several more detailed embodiments are described in the sections below. Section I provides a description of a hardware architecture of some embodiments. Section II then describes methods of operations used by some embodiments. Lastly, Section III describes a computer system which implements some of the embodiments.

I. Hardware Architecture

Figure 1:
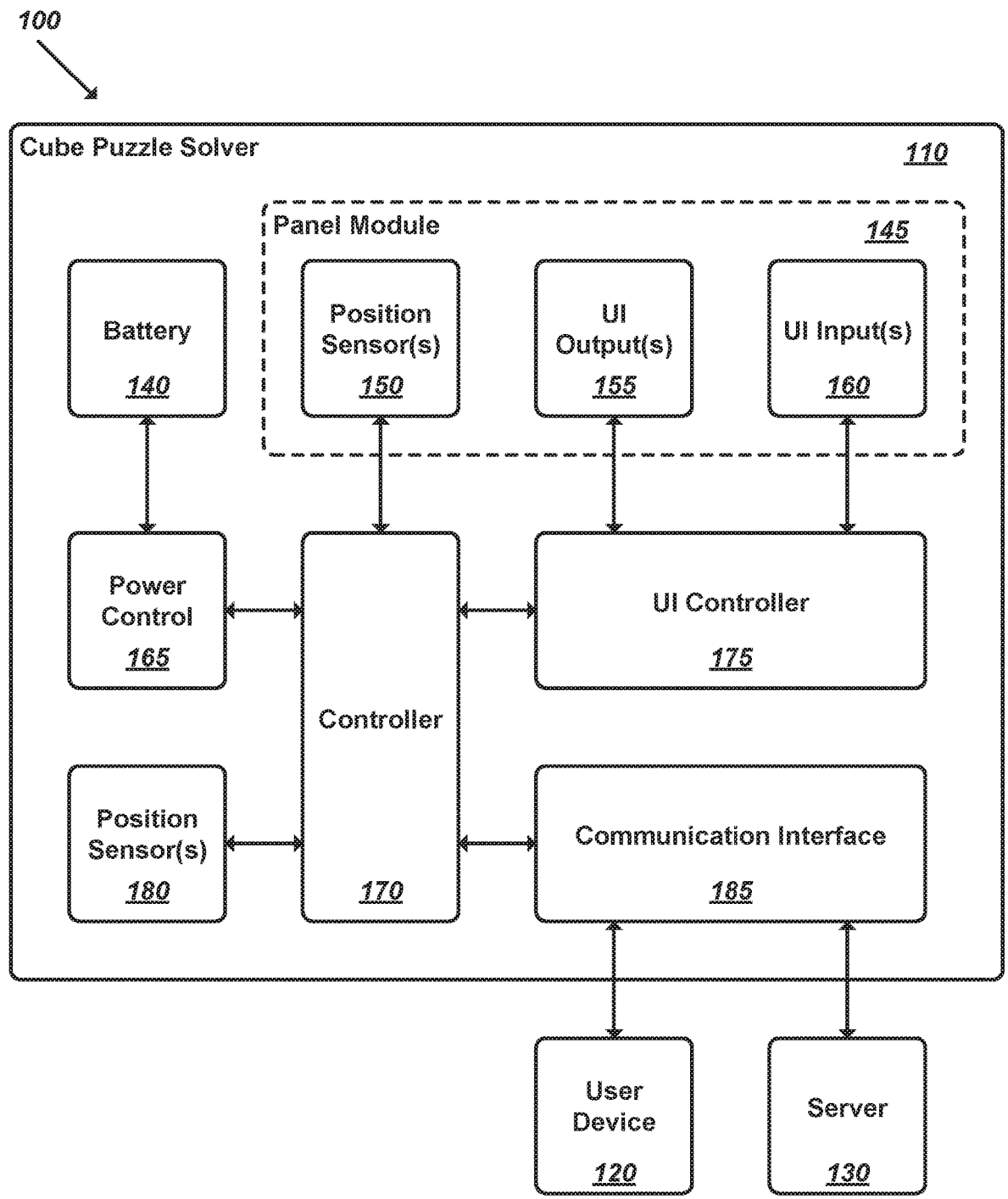
FIG. 1 illustrates a schematic block diagram of a cube puzzle solver system according to an exemplary embodiment.

FIG. 1 illustrates a schematic block diagram of a cube puzzle solver system 100 according to an exemplary embodiment. As shown, the system may include a cube puzzle solver 110, a user device 120, and a server 130. The cube puzzle solver 110 may include a battery 140, a set of panel modules 145 each panel module including a position sensor 150, UI outputs 155, and UI inputs 160, a power control 165, a controller 170, a UI controller 175, a position sensor 180, and a communication interface 185.

The cube puzzle solver 110 may include various electronic circuitry and/or devices. The cube puzzle solver may be embedded into the cube puzzle such that the size and shape of the cube puzzle are the same as for a cube puzzle that does not included the embedded solver and associated features.

The user device 120 may be a device such as a smartphone, laptop, tablet, wearable device, etc. that is able to communicate across one or more appropriate interfaces.

The server 130 may be a computing device that is able to execute instructions, process data, and communicate across one or more appropriate interfaces.

The battery 140 may be a single use or rechargeable battery that is able to provide power to the various components of the cube puzzle solver 110.

The panel module 145 may include various sub-elements, examples of which are described below. Each face of a cube puzzle may be associated with a different panel module. In some embodiments, some components may be shared across multiple panel modules. In addition, the panel modules may utilize various shared buses or other communication pathways within the solver 110.

The position sensor 150 may include various components that are able to detect a position and/or movement of a face associated with the panel module 145. Some embodiments may include sensors that provide power savings as the sensors are only engaged and drawing current when the cube is rotating and power may be reduced when the cube is in any fixed position.

Different embodiments may include various different position sensors 150 and/or combinations of sensors (e.g., accelerometers, encoders, etc.). Some embodiments may include multiple position sensors associated with each panel or face. For instance, some embodiments may include three accelerometer sensors in each face sub-element such that a three dimensional orientation may be determined. In some embodiments, the position sensors may not be able to determine absolute position but may be able to monitor changes to position (e.g., face rotations of at least forty-five degrees). In such cases, the cube state may need to be reset or otherwise provided (e.g., by downloading from a user device) if the current state is unknown (e.g., due to power loss).

The UI outputs 155 may include various indicators such as light emitting diodes (LEDs), haptic feedback elements (e.g., vibrating elements), audible outputs such as speakers, etc. One exemplary embodiment that includes two LED indicators (related to clockwise and counterclockwise movement) on each face is described in further detail below. The UI outputs may provide feedback to a user such that the user is able to solve the puzzle (or move to a state that is closer to a solution). Such feedback may include, for instance, lighted indication of a next move (e.g., a "best" move), indication of multiple possible moves, etc.

The UI inputs 160 may include elements such as buttons, touch screens, etc. One exemplary embodiment includes a pushbutton associated with each face as described in further detail below. Some embodiments may utilize the position sensors 150 as UI inputs 160. For instance, an input command may be associated with a full three hundred sixty degree rotation of a face. Such a command could be used to request a hint, power off the solver 110, etc.

The power control 165 may be able to provide charging power to the battery 140, distribute power from the battery to the other elements of the solver, and/or otherwise manage power reception, consumption, and/or distribution. Some embodiments may utilize magnetic chargers (and/or other wireless charging solutions). Alternatively, some embodiments may include a wired connector (e.g., a USB port) that allows a wired charging connection.

The controller 170 may receive data from and/or send commands to the various other components of the solver 110. The controller 170 may be associated with a memory (not shown) that is able to store instructions and/or data. The controller may execute algorithms, applications, etc. that are able to generate at least one solution based on a current state of the cube puzzle. Such a solution may include a series of moves, a best move, a next move, etc.

The UI controller 175 may interact with the controller 170, the UI outputs 155, and the UI inputs 160. The UI controller 175 may identify received inputs, such as button pushes, and send appropriate information to the controller 170. Likewise, the UI controller 175 may receive information from the controller 170 and generate appropriate commands for the UI outputs 155 such that feedback is provided to a user. An example UI controller 175 is described in more detail below.

The position sensor 180 may include various position sensing elements (e.g., accelerometers) that may be utilized to determine a relative position of the cube puzzle itself and/or sub-elements thereof. The position sensors 180 may include an inertial navigation unit (INU) that is able to sense three-dimensional acceleration, three-dimensional gyroscopic position, and/or three-dimensional magnetometer position, to identify (and/or quantify) three-dimensional movement and/or orientation of the puzzle solver 110.

For instance, the position sensor 180 may be used to determine which face(s) is/are visible to a user, and thus which UI outputs 155 should be used if multiple potential next moves are available, or to provide an indication on a visible face (e.g., by flashing multiple LED indicators at once) to indicate that the user should manipulate the position of the cube puzzle in order to identify the next move.

The communication interface 185 may be able to communicate with one or more user devices 120, servers 130, etc. Such an interface 185 may be able to communicate using various wireless (e.g., Bluetooth, WiFi, cellular, etc.) and/or wired (e.g., USB) communication pathways. Such communication pathways may include direct communication channels between devices, indirect pathways that may utilize various other devices (e.g., routers, hotspots, etc.), network pathways, etc.

One of ordinary skill in the art will recognize that system 100 may be implemented in various specific ways without departing from the scope of the disclosure. For instance, some embodiments may function as stand-along devices and may omit the communication interface 185. As another example, some embodiments may not utilize position sensors 180 that are not associated with a panel or face. In addition, some embodiments may include additional elements not described above. As still another example, some embodiments may include physical manipulation elements such as actuators, motors, etc. that may allow the puzzle solver 110 to manipulate the puzzle itself (e.g., by moving each face until the puzzle is solved). Some embodiments may include additional sensors, controllers, etc. Furthermore, the various elements may be arranged in various different ways and/or include various different communication pathways than shown.

Figure 2:
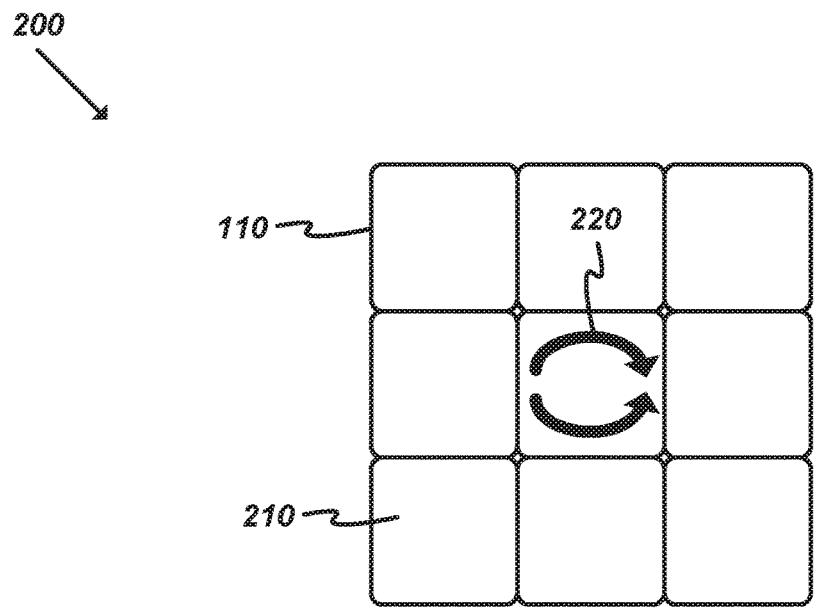
FIG. 2 illustrates a front elevation view of the cube puzzle solver of FIG. 1.

FIG. 2 illustrates a front elevation view of the cube puzzle solver 110. As shown, in this example, the puzzle solver 110 has six faces 200, each face including nine sub-elements 210.

In this example, the center sub-element 210 includes two UI elements 220 that indicate clockwise or counter-clockwise rotation. The UI elements may be formed using cutouts in the element face which may then be illuminated by LEDs. Different embodiments may include various different UI elements. For instance, some embodiments may space multiple LEDs along a circle and the LEDs may be lit in sequence to indicate rotation direction. Such solutions may include various diffusers or other elements that may make the "movement" of the LEDs appear more continuous.

Figure 3:
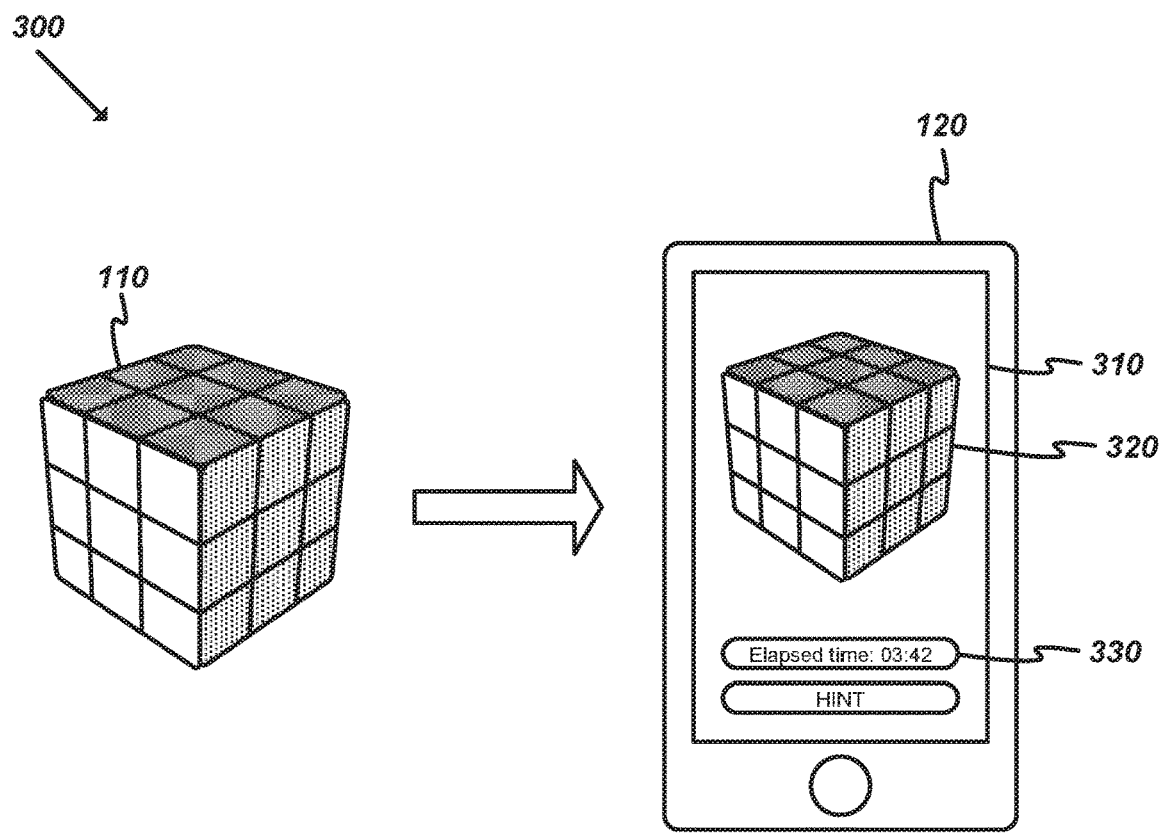
FIG. 3 illustrates a perspective view of the cube puzzle solver of FIG. 1 and a companion application.

FIG. 3 illustrates a perspective view of the cube puzzle solver 110 and a companion application. In this example, the cube puzzle solver 110 is associated with an app running on a user device 120. The user device may include a UI display 310. In this example, the display shows a three-dimensional representation of the puzzle solver 320 and various other UI elements 330 (e.g., buttons, text or graphics, etc.). In this example, the representation 320 matches the state of the physical puzzle 110. Different embodiments may display various different representations 320 (e.g., current state, target state, state after hint, etc.). In addition, the representation may include animation or other graphic elements that may indicate movement such that a hint (or other information) may be provided to a user.

The application may be used to provide instructions or hints to a user. In addition, such an app may be used to monitor the puzzle solver status and identify when a solution has been achieved. Users may be able to share results across social media or organize live competitions using the app. In some embodiments, the app may provide instructions to achieve a particular starting position so that all contestants may be competing from the same starting point.

One of ordinary skill in the art will recognize that the capabilities of the puzzle solver 110 (e.g., wireless communication, UI elements, etc.) may allow many different interactive games and/or other entertaining applications to be applied to use of such puzzles.

In some embodiments, the puzzle solver 110 may not include any UI elements. Instead, the solver may communicated with a user device 120 to receive user inputs, provide instructions, etc.

Figure 4:
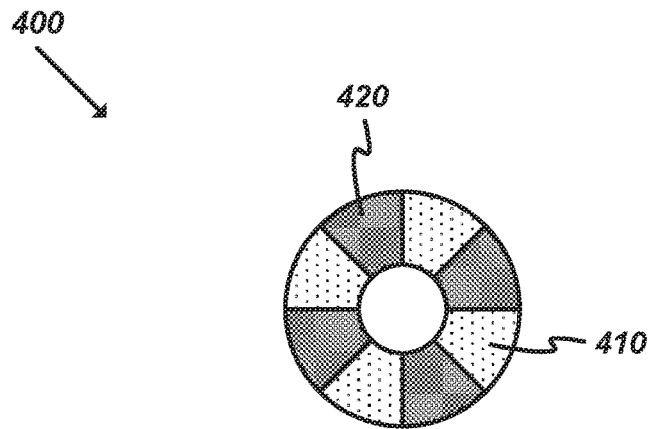
FIG. 4 illustrates a front elevation view of a position sensing element used by the cube puzzle solver of FIG. 1.

FIG. 4 illustrates a front elevation view of a position sensing element 400 used by the cube puzzle solver 110. As shown, the element 400 may be a circular member with a through-hole that allows the element to rotate about an axis. One such element may be included for each face of the cube puzzle solver. The element may include non-conducting regions 410 and conducting regions 420. The conducting regions 420 may include metal or other appropriate materials, while the non-conducting regions 410 may include plastic or other insulators. In this example, the regions are spaced at forty-five degree intervals. Different embodiments may utilize different spacings.

Figure 5:
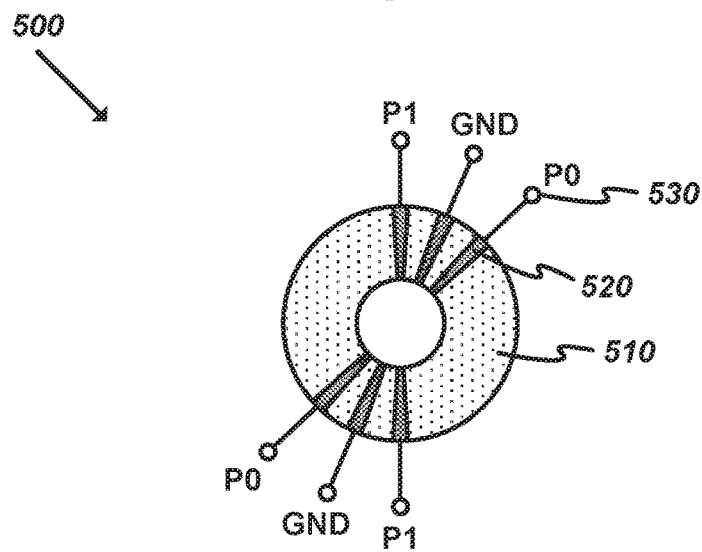
FIG. 5 illustrates a front elevation view of a complementary position sensing element used by the cube puzzle solver of FIG. 1.

FIG. 5 illustrates a front elevation view of a complementary position sensing element 500 used by the cube puzzle solver 110. The element 500 may be a stationary element with a through hole that allows mounting about the same axis as the rotating element 400. As shown, element 500 may include non-conducting regions 510 and conducting regions 520. In this example, the conducting regions 520 are coupled to various connectors (or "pins") 530 that allow for supply connection, communication of outputs, etc.

The conducting regions 520 associated with pins P0 and P1 are spaced at forty-five degrees apart, with the ground region in the center of the two. Pin GND may be connected to a ground supply, while pins P0 and P1 may be connected to a voltage supply through pull-up resistors. In some embodiments, the conducting regions 520 associated with pins P0 and P1 may be spaced less than the width of region 420 such that the position sensing signals are non-overlapping (i.e., only one signal changes at a particular angle of rotation).

Figure 6:
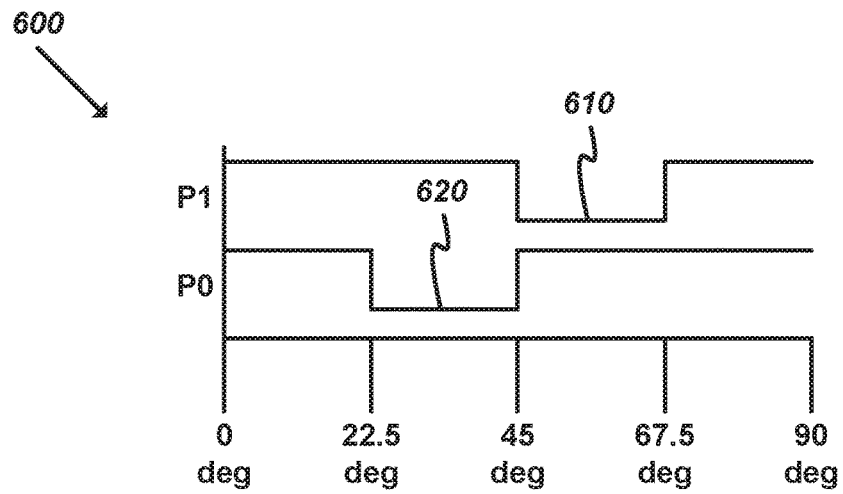
FIG. 6 illustrates a timing diagram of outputs produced by the position sensing elements of FIG. 4 and FIG. 5 over a ninety degree rotation.

FIG. 6 illustrates a timing diagram 600 of outputs 610-620 produced by the position sensing elements 400 and 500 over a ninety degree rotation. As shown, when an output pin (P0 or P1) and the GND pin are connected via a conducting region 420, the output associated with the output pin is brought to a logic low state.

The resulting gray code output signals 610-620 may be analyzed to determine rotation angle and direction. Typically, faces will be rotated in ninety degree increments. As such, rotations may be applied after two complete pulses as shown (between zero and ninety degrees in this example). In this configuration, when the faces are in typical ninety degree positions (within plus and minus twenty-two and one half degrees), no current (aside from leakage) is drawn through the pull-up resistors connected to pins P0 and P1. Thus, the position sensors may be configured, such as in this example, to use a minimum amount of power in such "square" states (i.e., rotation of zero, ninety, one hundred eighty, and two hundred seventy degrees) by ensuring that the pins are in an open circuit state. In this example, relative position is able to be detected (and absolute position may be stored using state machines or other appropriate elements).

Figure 7:
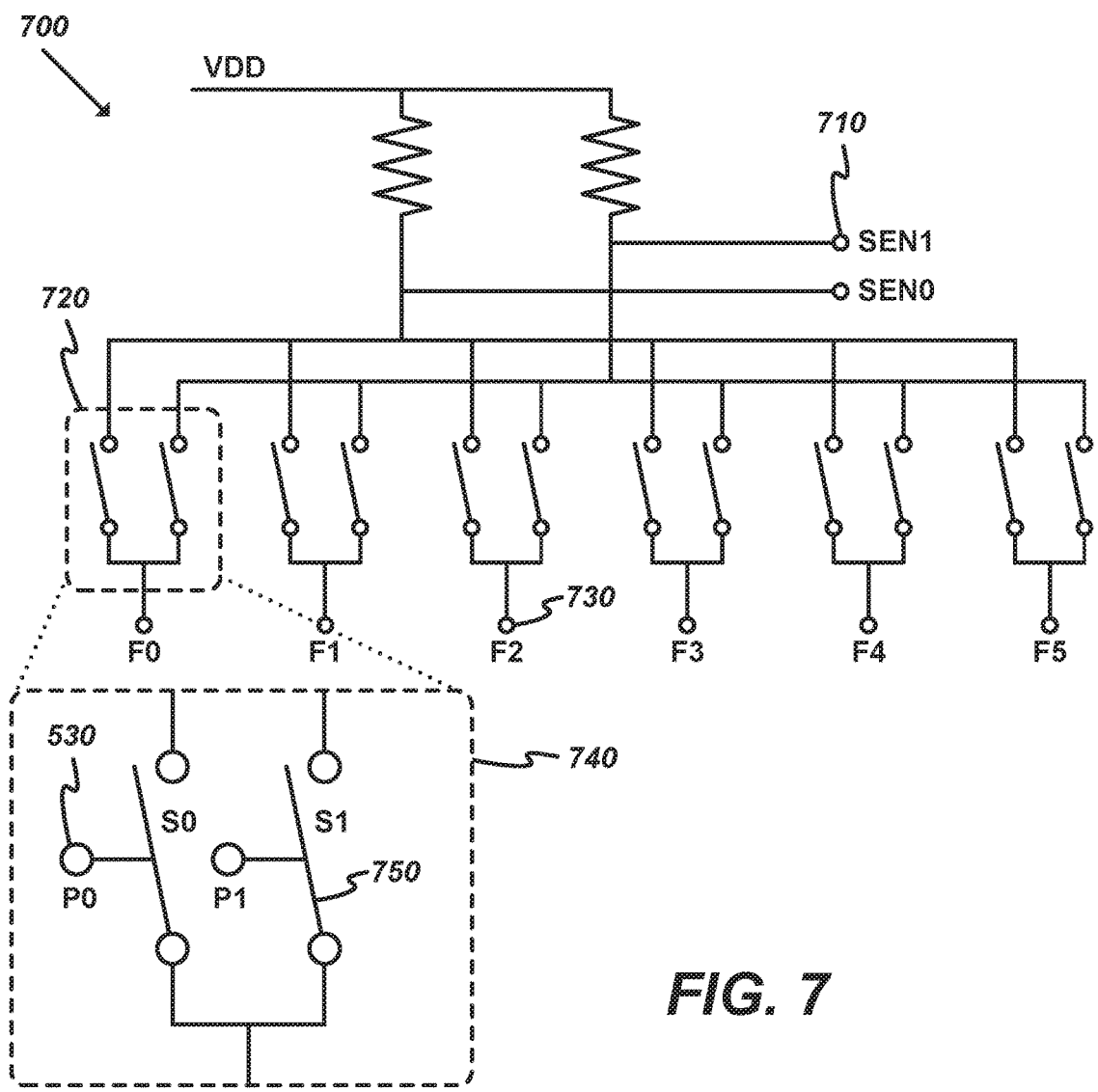
FIG. 7 illustrates a schematic diagram of interface circuitry for sensing the outputs of multiple position sensing elements.

FIG. 7 illustrates a schematic diagram of interface circuitry 700 for sensing the outputs of multiple position sensing elements. As shown, the circuitry may include output connections 710, multiple switch pairs 720, and input connections 730. As shown in exploded view 740, switches 750 may be controlled by the outputs P0 and P1 described above (where the switches may be closed if either signal is logic low in this example).

Figure 8:
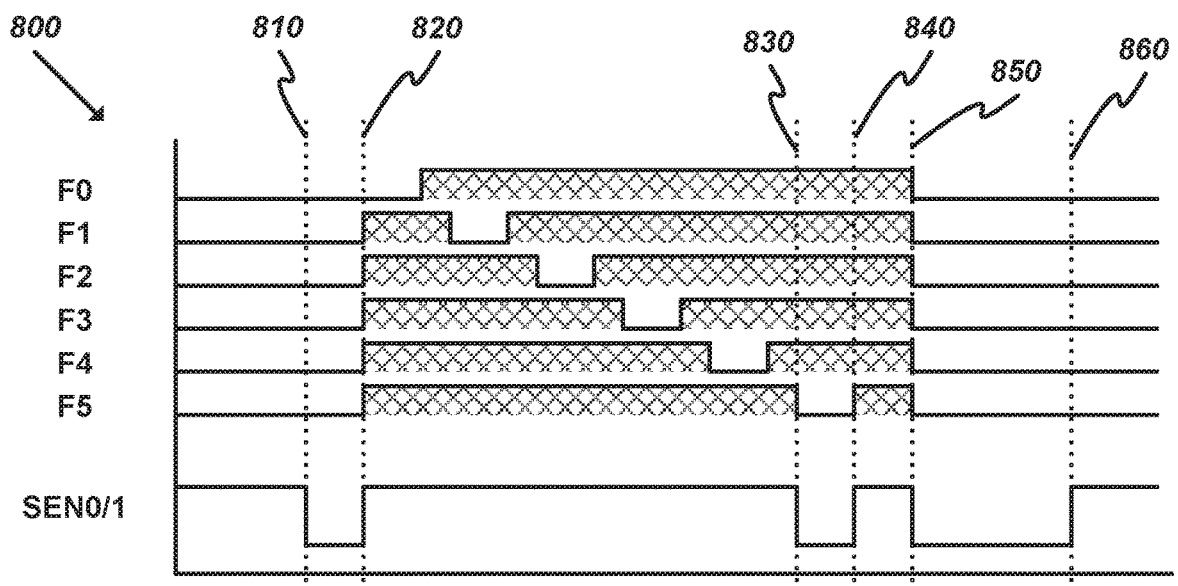
FIG. 8 illustrates a timing diagram of outputs and control signals used to manipulate the interface circuitry of FIG. 7.

FIG. 8 illustrates a timing diagram 800 of outputs and control signals used to manipulate the interface circuitry 700. In this example, a single instantiation of the interface circuitry is able to detect rotation on all six faces of the cube puzzle solver 110.

As shown, initially all face control signals (F0-F5) may be set to logic low, while both sense pins (SEN0 and SEN1) are logic high, indicating all switches 750 are open. As a face is rotated past twenty-two and one half degrees, one of the sense signals goes low 810. In response, the face control signals may be cycled as shown, where one is brought low while the rest are set to a high impedance state 820. In this way, each face can be evaluated separately after rotation has been detected. In this example, the sense pin does not go low again until control signal F5 is brought low 830, indicating that the rotation is associated with that face.

In this example, all control signals are set to high impedance 840 before resuming detection by bringing all control signals low 850. Alternatively, all control signals may be brought low after the face is identified. Finally, the sense pin associated with the rotation event goes high 860, indicating the end of the event (of course, the other sense pin may go low at about the same time if the face is being rotated past forty-five degrees). Such events may be monitored such that complete ninety degree rotations are identified, as well as detection of rotation direction.

In the examples above and below, many signals are shown without timing delays or gaps between edged. One of ordinary skill in the art will recognize that actual implementations may include slight offsets (e.g., by including conducting regions 420 slightly less than forty-five degrees in the example above), such that signal edges do not overlap.

Figure 9:
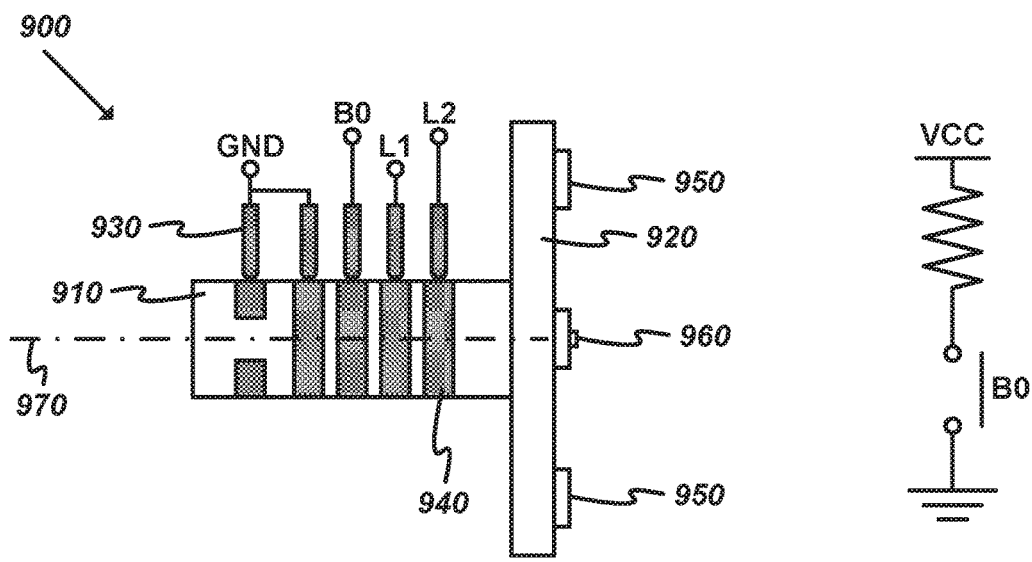
FIG. 9 illustrates a front elevation view of an alternative position sensing element used by the cube puzzle solver of FIG. 1.

FIG. 9 illustrates a front elevation view of an alternative position sensing element 900 used by the cube puzzle solver 110. As shown, this element 900 may include a rotating shaft 910, a faceplate 920, multiple contacting pins 930, multiple conducting regions 940, various UI indicators 950, and a pushbutton input 960. The shaft 910 may rotate about axis 970.

The contacting pins 930 may carry signals between the sensing element 900 and other components. In this example, the pushbutton 960 is associated with output B0, while the UI indicators 950 (e.g., indicators such as indicators 220 described above) are controlled by inputs L1 and L2.

In some embodiments, the pushbuttons 960 may all provide the same functionality (e.g., each may be used to power on the device, request a hint, change solving algorithm, etc.). The pushbutton may be able to identify different types of inputs (e.g., tap, multi-tap, tap and hold, etc.). In some embodiments, the pushbuttons may be associated with different functions. Some embodiments may not include a pushbutton on each face (or may omit the pushbutton altogether). In some embodiments, one or more pushbuttons may be replaced by a different element (e.g., a charging connector).

Figure 10:
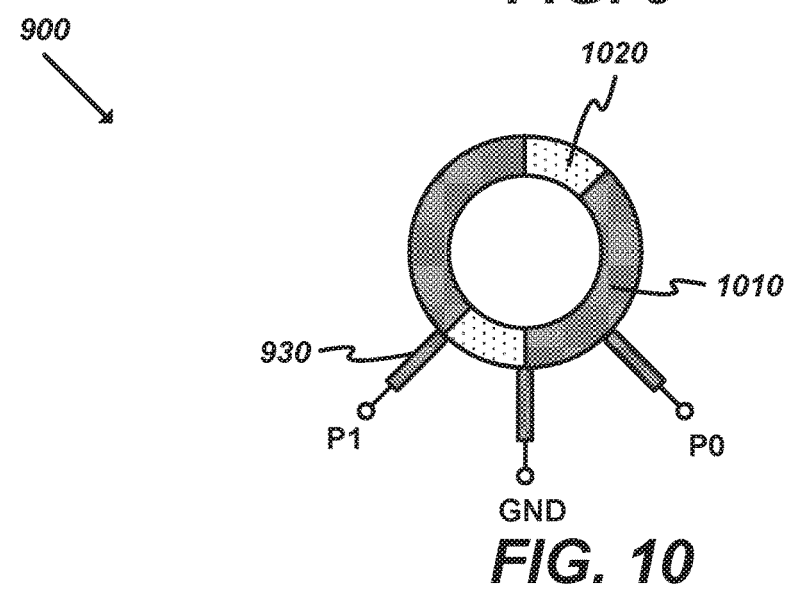
FIG. 10 illustrates a front section view of the alternative position sensing element of FIG. 9.

FIG. 10 illustrates a front section view of the alternative complementary position sensing element 900. In addition to the pins described above, this example includes output pins P0 and P1. In this example, all of the conducting regions 940 go completely around the shaft 910 except for the leftmost "sensing" region 940. As shown, the sensing region may include conducting regions 1010 and non-conducting regions 1020. The non-conducting regions may span forty-five degrees while the conducting regions span one hundred thirty-five degrees. The output pins P0 and P1 are spaced at forty-five degrees about the GND pin.

Figure 11:
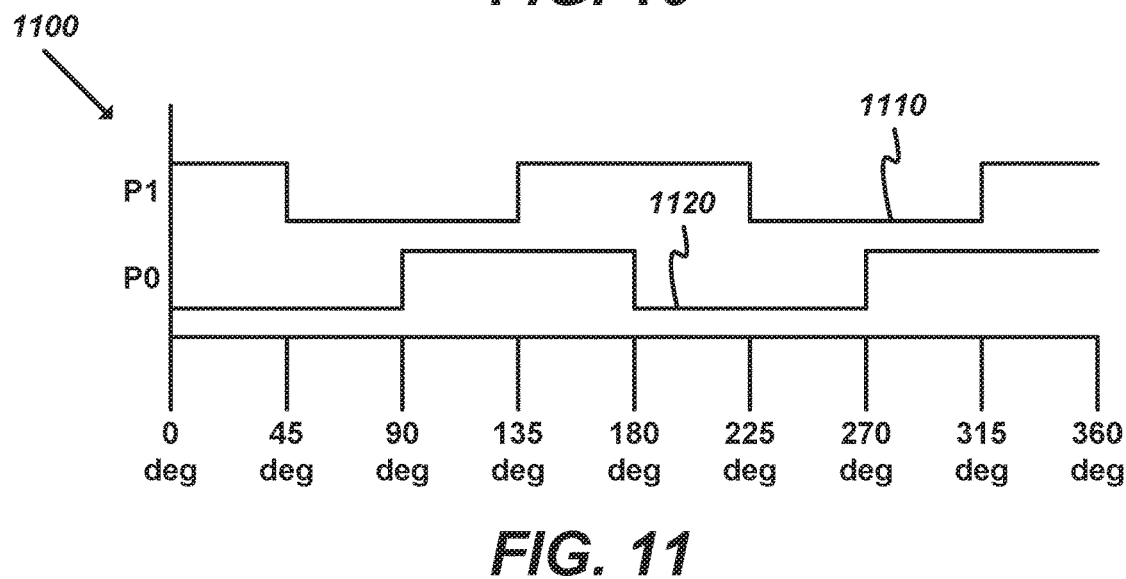
FIG. 11 illustrates a timing diagram of outputs produced by the position sensing element of FIG. 9 and FIG. 10 over a full rotation.

FIG. 11 illustrates a timing diagram 1100 of outputs 1110-1120 produced by the position sensing element 900 over a full rotation. As above, the output pins P0 and P1 may be coupled to a voltage supply through pull-up resistors. In this example, the sensing element 900 may be able to detect absolute rotary position over one hundred eighty degree intervals in forty-five degree increments.

Figure 12:
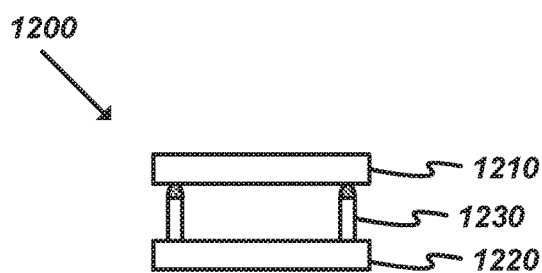
FIG. 12 illustrates a side elevation view of another alternative position sensing element used by the cube puzzle solver of FIG. 1.

FIG. 12 illustrates a side elevation view of another alternative position sensing element 1200 used by the cube puzzle solver 110. This example includes a rotating portion 1210 and a static portion 1220 that includes multiple spring-loaded contact pins 1230.

Figure 13:
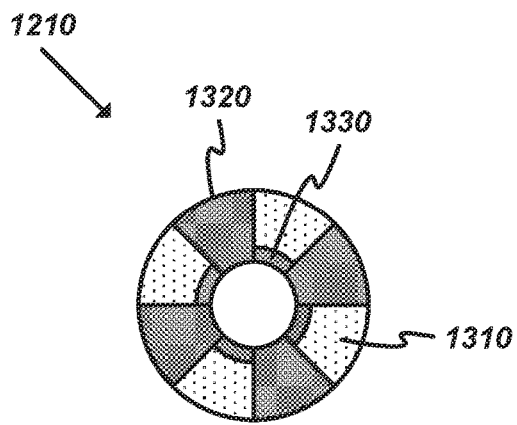
FIG. 13 illustrates a front elevation view of a moving portion of the alternative position sensing element of FIG. 12.

FIG. 13 illustrates a front elevation view of the moving portion 1210 of the alternative position sensing element 1200. As shown, the moving portion 12010 may include various non-conducting regions, and conducting regions 1320-1330. In some embodiments, the conducting regions may all be connected to a ground supply, while the pins 1230 may be coupled to a voltage supply through pull-up resistors.

Figure 14:
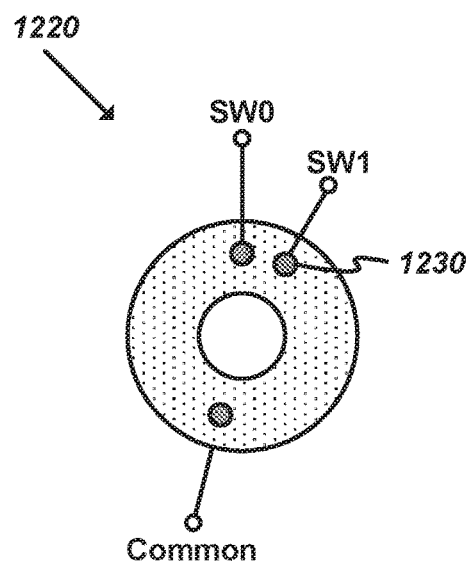
FIG. 14 illustrates a front elevation view of a static portion of the alternative position sensing element of FIG. 12.

FIG. 14 illustrates a front elevation view of the static portion 1220 of the alternative position sensing element 1200. In this example, the SW1 and SW2 outputs are spaced at thirty degrees, while the common terminal is at an angle of one hundred ninety-five degrees.

Figure 15:
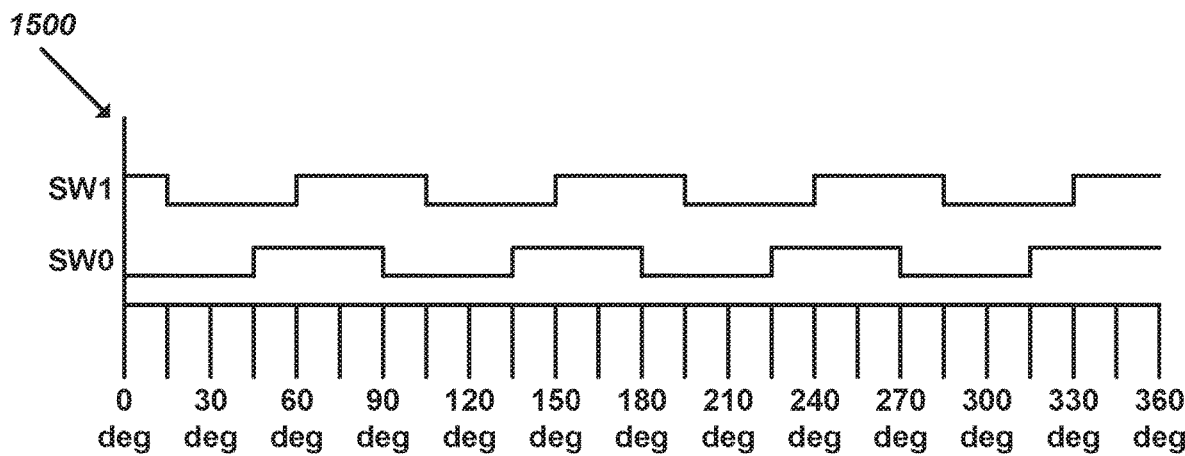
FIG. 15 illustrates a timing diagram of outputs produced by the position sensing element of FIG. 12 over a full rotation.

FIG. 15 illustrates a timing diagram of outputs produced by the position sensing element 1200 over a full rotation. As shown, position may be able to be sensed in thirty degree increments.

Figures 16, 17:
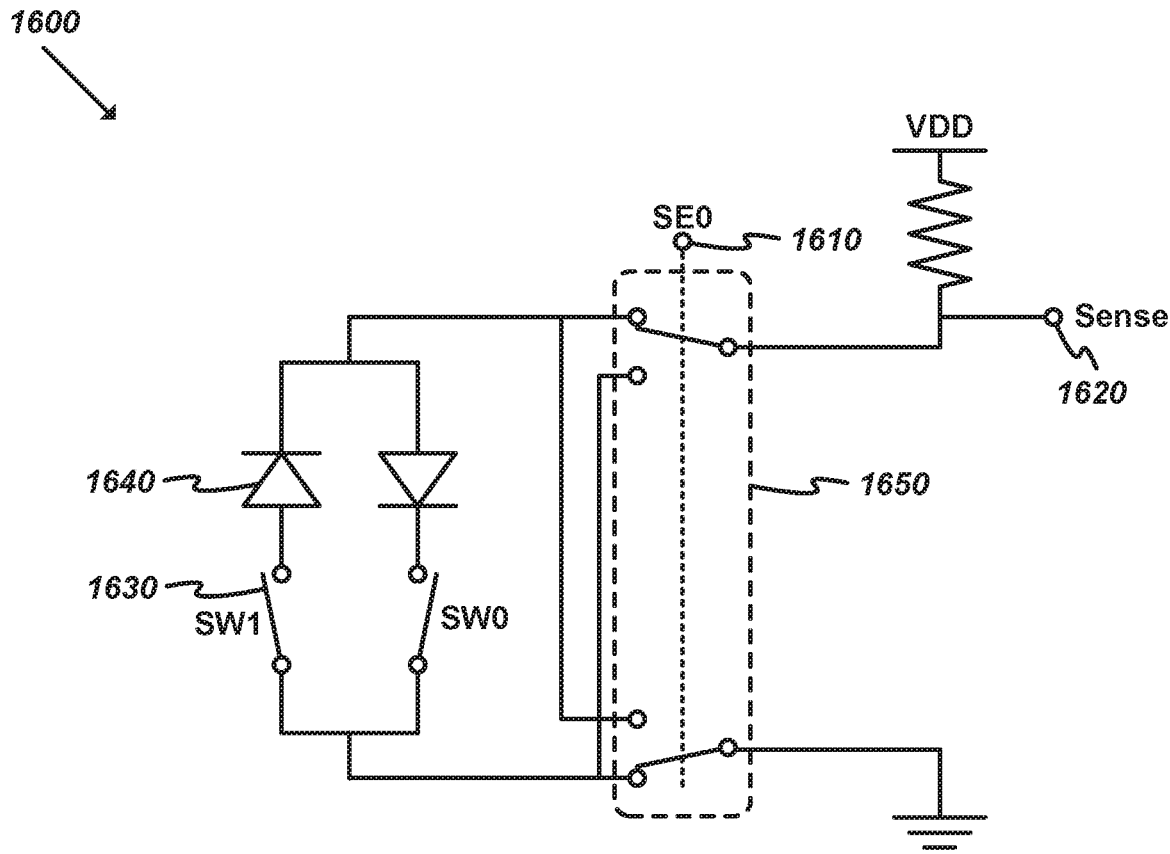
FIG. 16 illustrates a schematic diagram of interface circuitry used by the cube puzzle solver of FIG. 1 to sense switch positions of position sensing elements.
FIG. 17 illustrates a truth table describing the operation of the interface circuitry of FIG. 16.

FIG. 16 illustrates a schematic diagram of interface circuitry 1600 used by the cube puzzle solver 110 to sense switch positions of position sensing elements, such as those described above. As shown, the circuitry 1600 may include a control pin 1610, a sense output 1620, a pair of switches 1630 under evaluation, a pair of associated diodes 1640, and a switch 1650. In some embodiments, the switch may be implemented by reconfiguring digital input/output pins of a microcontroller device.

FIG. 17 illustrates a truth table 1700 describing the operation of the interface circuitry 1600. Such an approach may be used to determine the state of switches such as switches 750 described above.

Figures 18, 19:
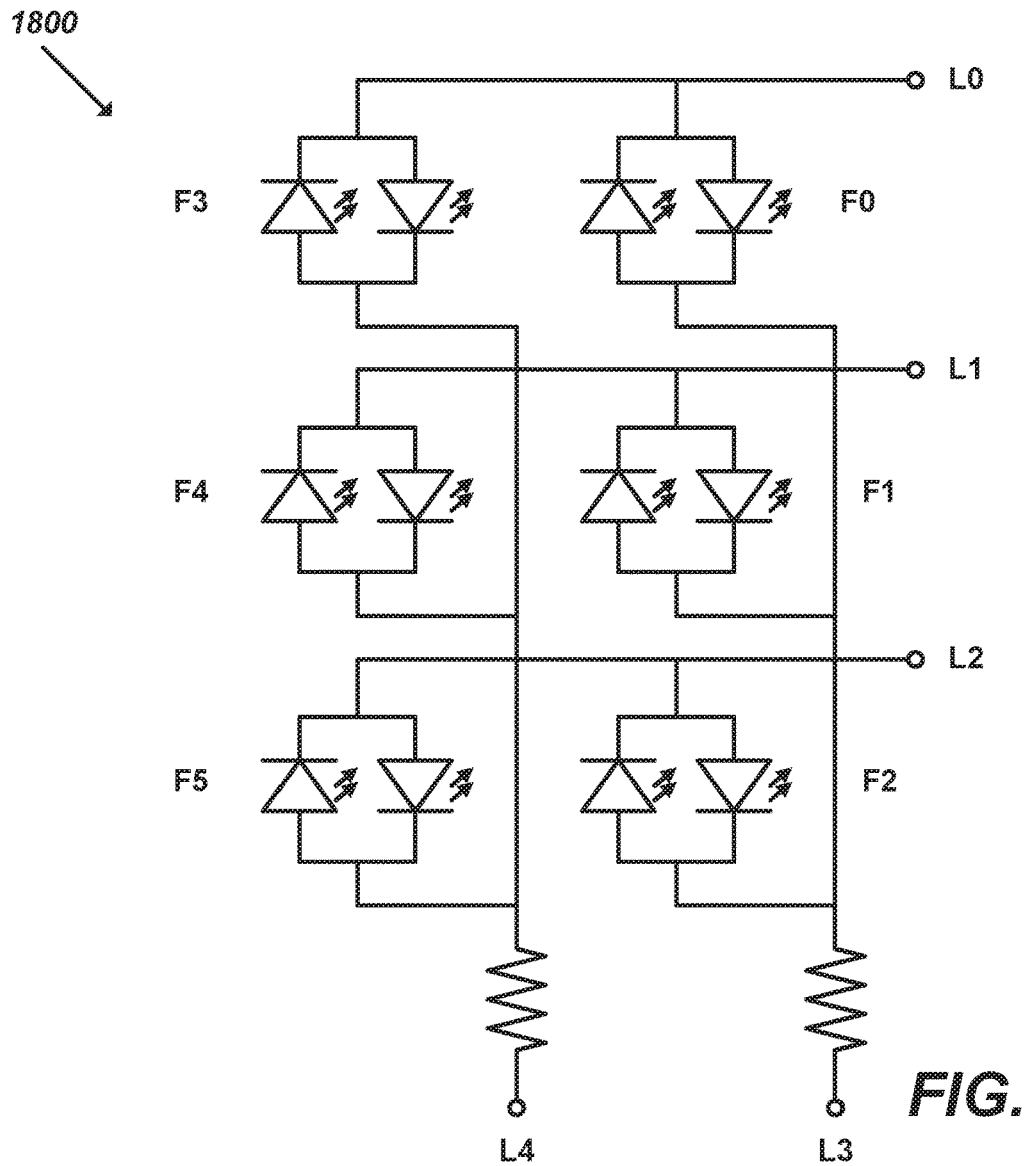
FIG. 18 illustrates a schematic diagram of circuitry used by the cube puzzle solver of FIG. 1 to generate user interface (UI) outputs.
FIG. 19 illustrates a truth table showing the signals used to generate the various UI outputs using the circuitry of FIG. 18.

FIG. 18 illustrates a schematic diagram of circuitry 1800 used by the cube puzzle solver 110 to generate UI outputs. Such UI outputs may be similar to the UI elements 220 and 950 described above. Each individual LED may be lit up by driving pins L0-L4 to a logic low, high, or high impedance state. In addition, the LEDs may be switched at a high enough rate that more than one LED appears on at a time.

FIG. 19 illustrates a truth table 1900 showing the signals used to generate the various UI outputs using the circuitry 1800. As shown, each face F0-F5 may be associated with a pair of LEDs. Control lines L0-L4 may be used to control the indicators for each face.

Figure 20:
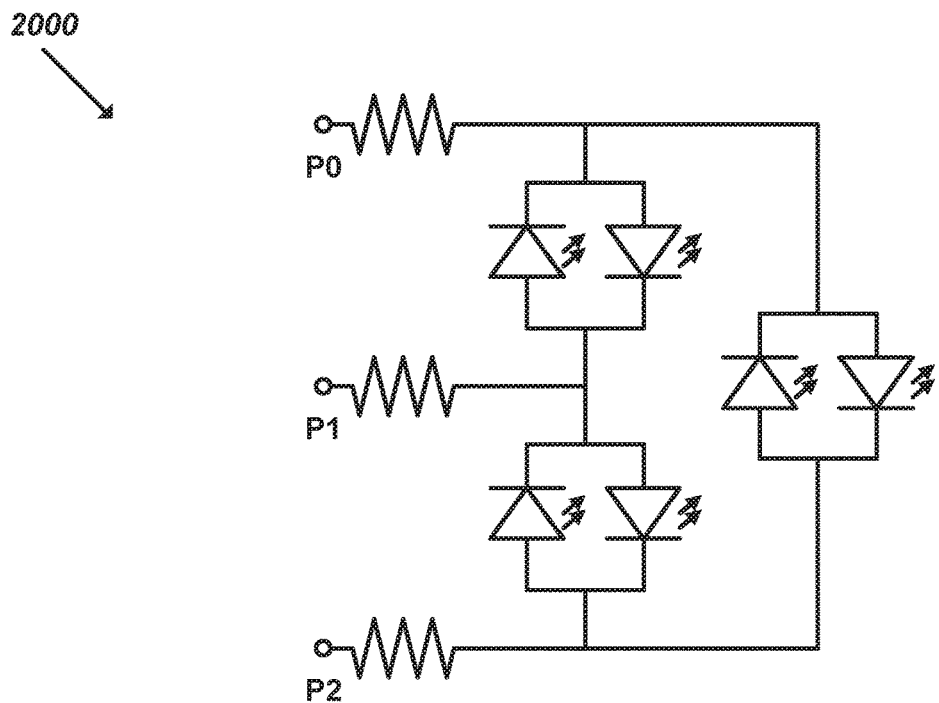
FIG. 20 illustrates a schematic diagram of alternative circuitry used by the cube puzzle solver of FIG. 1 to generate UI outputs.
Figure 21:
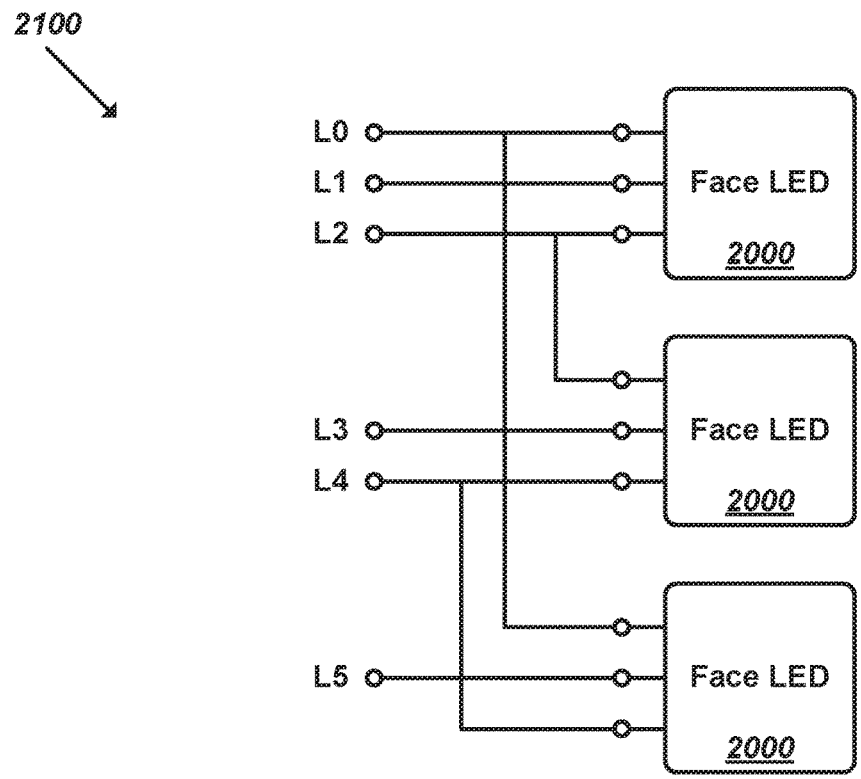
FIG. 21 illustrates a schematic diagram of control circuitry used by the cube puzzle solver of FIG. 1 to generate UI outputs using the alternative circuitry of FIG. 20.

FIG. 20 illustrates a schematic diagram of alternative circuitry 2000 used by the cube puzzle solver 110 to generate UI outputs. FIG. 21 illustrates a schematic diagram of control circuitry 2100 used by the cube puzzle solver 110 to generate UI outputs using the alternative circuitry 2000. As shown, three faces with six LEDs on each face may be controlled by six signal lines.

One of ordinary skill in the art will recognize that different embodiments may be implemented in different specific ways without departing from the scope of the disclosure. For instance, some embodiments may include multiple types of sensing elements (e.g., absolute and relative). In addition, some embodiments may include accelerometers or gyroscopes that may be able to determine the position of the puzzle solve itself rather than the components thereof (e.g., to identify which face of the puzzle is being viewed by a user). As another example, different embodiments may include different numbers and types of UI elements.

II. Methods of Operation

Figure 22:
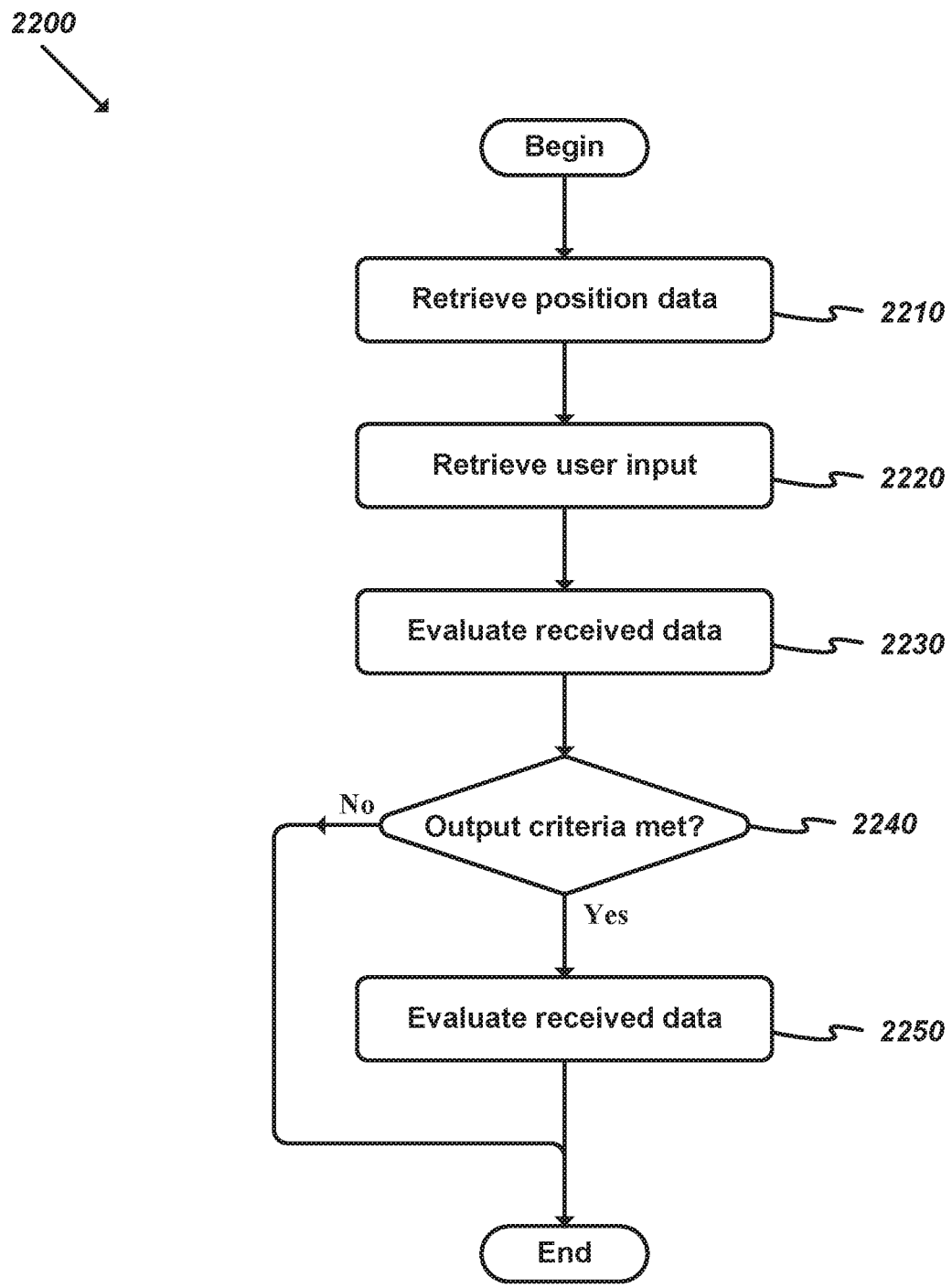
FIG. 22 illustrates a flow chart of an exemplary process that evaluates a cube puzzle and generates user interface outputs.

FIG. 22 illustrates a flow chart of an exemplary process 2200 that evaluates a cube puzzle and generates user interface outputs. Such a process may be executed by a device such as the puzzle solver 110 described above. The process may start, for instance, when a puzzle solver of some embodiments is powered on, when a user requests a hint, and/or at other appropriate times.

As shown, the process may retrieve (at 2210) position data. Such data may be retrieved by an element such as controller 170 from elements such as position sensors 150 and/or position sensors 180. Such position data may include a state of the puzzle, a change from a previous state, a sensed movement, etc.

Next, the process may retrieve (at 220) any user input. User inputs may include, for instance, button pushes, manipulation of the puzzle (e.g., shaking the puzzle), manipulation of a puzzle face or other element, etc. In addition, user inputs may be received from an external device or element (e.g., a smartphone) via a component such as communication interface 185.

In some cases, the position data and user input may be retrieved as a single entity (e.g., when a user changes a face position, the change in face position may change the state of the cube and be interpreted as a request for a next move). In other cases, the process may wait for a user input before proceeding. For instance, a user may change a face position (whether based on a previous hint or not) and no further action may be taken unless the user request a hint (e.g., by pushing a button) or some other appropriate criteria is met (e.g., elapsed time since last move exceeds a threshold value).

The process may then evaluate (at 230) the retrieved position data and/or user input data. Such evaluation may include determining a current state of the puzzle, identifying a next move (or set of potential moves), identifying a best move, identifying non-productive moves, etc. Some embodiments may utilize the previous state to determine the current state of the puzzle. For instance, some embodiments may include a microprocessor (and/or other appropriate processing devices and associated memories) that is able to determine and store the state of the puzzle.

Process 200 may then determine (at 240) whether any output criteria has been met. Such output criteria may include, for instance, determining whether a hint request has been received. If the process determines (at 240) that no output criteria have been met, the process may end.

If the process determines (at 240) that some output criteria have been met, the process may activate (at 250) the appropriate UI output elements (e.g., by lighting a single rotation indicator) and then may end. In cases where an external device is communicating with the solver, the process may send appropriate commands or messages to the external device such that the external device provides appropriate UI output (e.g., by updating a display screen).

In addition, some embodiments may collect information and distribute the collected information to various external resources (e.g., servers) such that information may be shared across social networks or other appropriate venues. Such information may include, for example, state information, solution times or other performance statistics, etc.

Furthermore, some embodiments may utilize one or more user devices to retrieve state information, position data, provide user outputs, and/or otherwise implement process 200. For instance, some embodiments may allow a user to use a camera to capture a current state of the cube puzzle. As another example, some embodiments may utilize a user device screen to provide a rendering of the puzzle and indicate a next move, a series of moves, etc. as described above in reference to FIG. 3.

Figure 23:
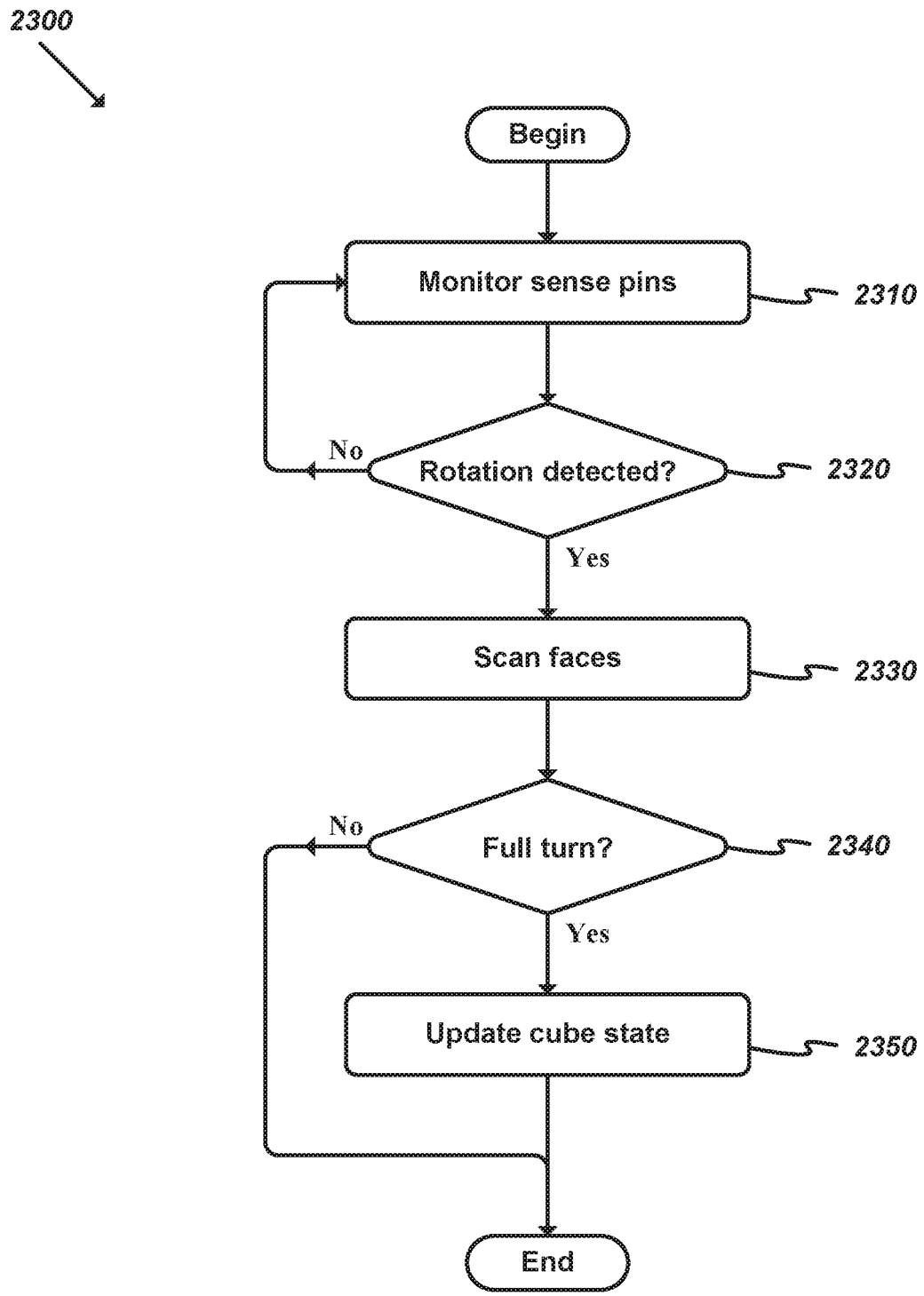
FIG. 23 illustrates a flow chart of an exemplary process that detects a change in state of the cube puzzle solver of FIG. 1.

FIG. 23 illustrates a flow chart of an exemplary process 2300 that detects a change in state of the cube puzzle solver 110. Such a process may be executed by a device such as the puzzle solver 110 described above. The process may start, for instance, when a puzzle solver of some embodiments is powered on or when motion is detected.

As shown, the process may monitor (at 2310) sense pins such as those described above in reference to sense outputs 710. Next, the process may determine (at 2320) whether rotation has been detected. Such a determination may be made based on the received sense pins (e.g., when either sense pin goes low in the example above, a partial rotation is detected). If the process determines (at 2320) that no rotation is detected, the process may repeat operations 2310-2320 until the process determines (at 2320) that rotation has been detected.

If the process determines (at 2320) that rotation is detected, the process may scan (at 2330) the faces of the puzzle. Such scanning may be achieved in a similar manner to that described above in reference to diagram 800.

After identifying the face associated with the rotation, process 2300 may continue to monitor that face while the process determines (at 2340) whether a full ninety degree rotation has been achieved. Depending on the next signal edge detected on the sense pins, the rotation may be continuing toward a full rotation (or have achieved a full rotation) or may reverse back to the starting position (or may pause in an intermediary state).

If the process determines (at 2340) that a full turn has been executed, the process may update (at 2350) the puzzle state to reflect the change in position and then may end. If the process determines (at 2340) that no full turn has been executed (either due to a partial turn or a return to the original position), the process may end without updating the state of the puzzle.

In some embodiments, a user may be able to store or "lock" a state such that the user can return to that state. In that way, a user may be able to test various strategies or routines while being able to revert to a particular state (e.g., a user may wish to save a state where two sides are solved as the user attempts to solve a third side).

Process 2300 may be executed iteratively, as long as a puzzle is in use. The final state determined before a power down or timeout event may be stored such that the state may be retrieved the next time the puzzle is powered on.

Figure 24:
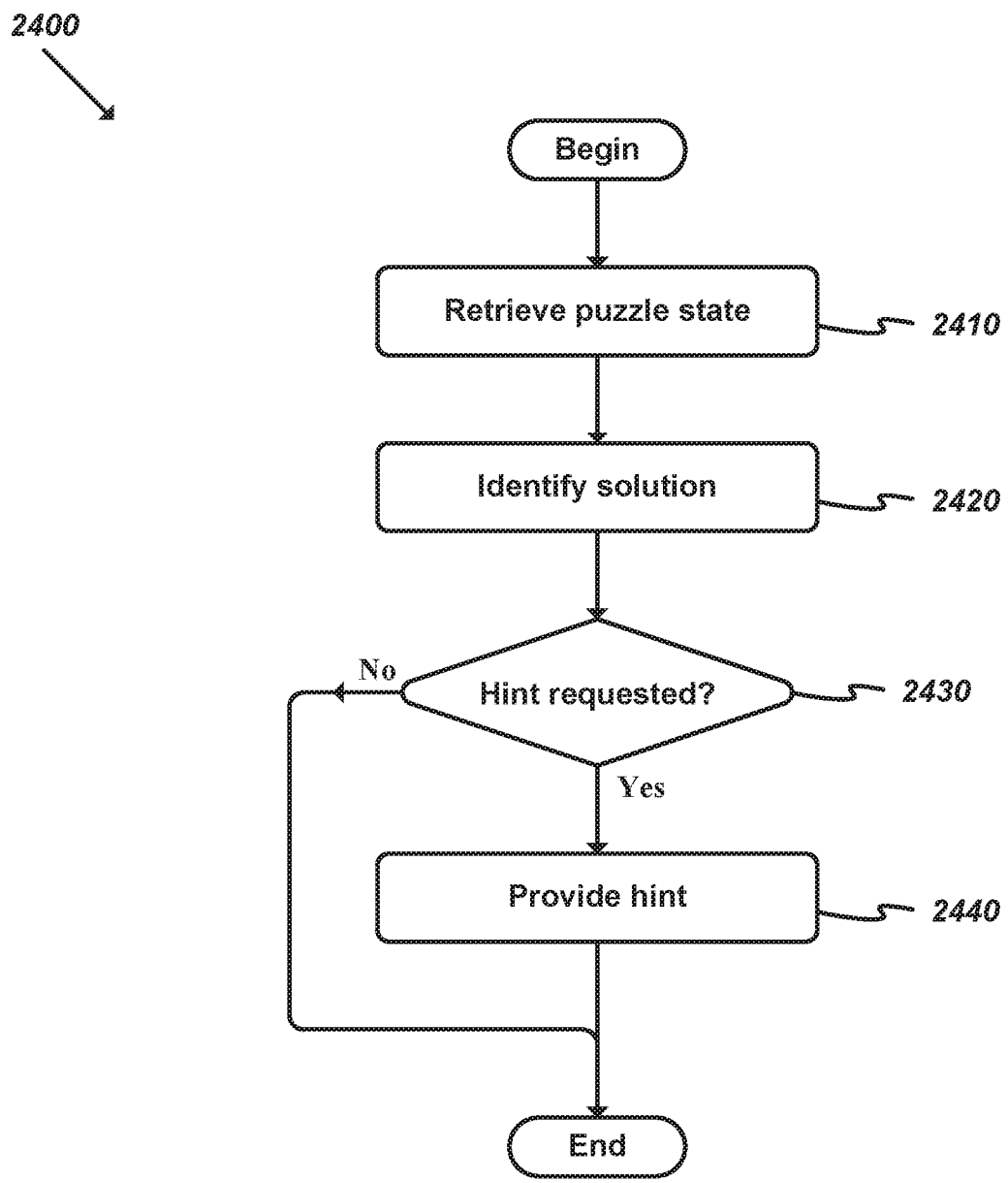
FIG. 24 illustrates a flow chart of an exemplary process that generates a solution for the cube puzzle solver of FIG. 1 and provides instructions via the UI elements of some embodiments.

FIG. 24 illustrates a flow chart of an exemplary process 2400 that generates a solution for the cube puzzle solver 110 and provides instructions via the UI elements of some embodiments. Such a process may be executed by a device such as the puzzle solver 110 described above. The process may start, for instance, when a puzzle solver of some embodiments is powered on, when a rotation is detected (i.e., when the state is updated using a process such as process 2300), and/or at other appropriate times.

As shown, process 2400 may retrieve (at 2410) the current puzzle state. Such a state may specify a position for every moveable sub-element of each puzzle face. Depending on the capabilities of the device, the state may include a relative position of some sub-elements (e.g., indicating which face is facing upward at a given time). The positions may indicate where on each face the sub-element is currently located, as well as the orientation of the sub-element, if applicable. For instance, corner pieces may be associated with three faces and the position may indicate at which corner the piece is currently positioned, as well as the face associated with each indicator of the piece (e.g., the orientation of colors).

Next, the process may identify (at 2420) a solution. The solution may be identified in various appropriate ways and based on various factors. For instance, a beginner may request a "solution" that achieves one complete side of a cube puzzle in the correct orientation. As another example, a solution may be a pattern (e.g., checkerboard) or position other than the standard solid color across each face solution. As another example, a solution may be a single optimal move. The solution may be based on various different algorithms (e.g., a "master" algorithm that solves in a minimum number of moves, a layer-by-layer algorithm, etc.).

The identified solution may be associated with a number of movements necessary to achieve the solution from the current state. Each movement may be provided to the user as a "hint" or instruction. Such movements may be listed in various orders, depending on the algorithm employed.

The process may then determine (at 2430) whether a hint has been requested. Such a determination may be made based on various appropriate criteria. For example, a user may push a button (or multi-tap, push and hold, etc.) to request a hint. As another example, a user may shake the puzzle to request a hint. As still another example, some embodiments may provide a hint after a specified time has lapsed since a last move.

If the process determines (at 2430) that no hint has been requested, the process may end. If the process determines (at 2430) that a hint has been requested, the process may provide (at 2440) the hint and then may end. Such a hint may be provided using the UI indicators described above, or other appropriate ways.

Figure 25:
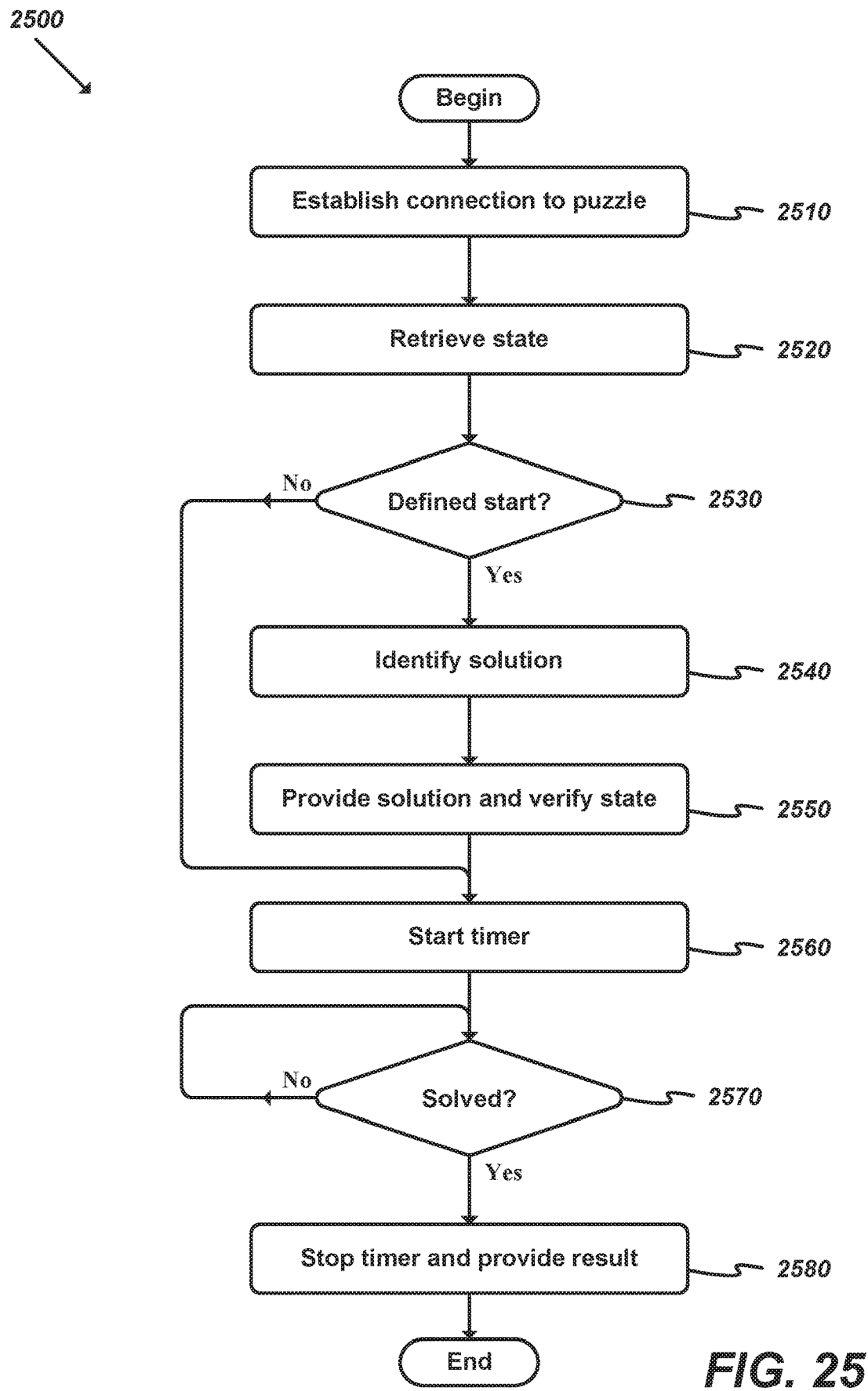
FIG. 25 illustrates a flow chart of an exemplary process that evaluates performance of a user in manipulating the cube puzzle solver of FIG. 1.

FIG. 25 illustrates a flow chart of an exemplary process 2500 that evaluates performance of a user in manipulating the cube puzzle solver 110. Such a process may be executed by a device such as the user device 120 described above. The process may start, for instance, when a puzzle solver of some embodiments is powered on, when a user launches an app of some embodiments, and/or at other appropriate times.

As shown, the process may establish (at 2510) a connection to the puzzle device. Such a connection may be established using wired or wireless communication channels. Next, the process may retrieve (at 2520) the current state of the puzzle. The state may be retrieved from a local storage, by evaluating absolute position of the puzzle faces, and/or other appropriate ways (e.g., a user may take a picture of each face and upload the pictures to the app for analysis).

The process may then determine (at 2530) whether there is a defined starting state for the puzzle. Such a state may be associated with a particular live event or contest, standing challenge, etc. In this way, users may be able to compete by solving puzzles from the same starting state.

If the process determines (at 2530) that there is a defined starting state, the process may identify (at 2540) a solution that will achieve the desired starting start based on the current state. Next, the process may provide (at 2550) the solution and verify the starting state. The solution may be provided using step-by-step rotation instructions via the UI elements of device 110 and/or via a device display.

After providing (at 2550) the solution and verifying the state or after determining (at 2530) that there is no defined start state, the process may start (at 2560) a timer. Such a timer may be associated with multiple devices (e.g., during a live competition) or a single device (e.g., a user may compete against another user's result or a past result).

Alternatively to using a time, some embodiments may count the number of moves or use other appropriate performance metrics.

Next, the process may determine (at 2570) whether the puzzle has been solved. Such a determination may be made by comparing a current state of the puzzle to a solution state. Processes such as processes 2300 and 2400 (or portions thereof) may be executed to determine whether the puzzle has been solved.

The process may continue monitoring the puzzle state and comparing the state to a solution state until the process determines (at 2570) that the puzzle has been solved. The process may then stop (at 2580) the timer (or other metric counter) and provide the result (e.g., elapsed time, number of moves, hints requested, etc.) and then may end.

The result may be stored and/or shared across other resources (e.g., social media, user groups, etc.).

One of ordinary skill in the art will recognize that processes 2200-2500 may be performed in various different ways without departing from the scope of the disclosure. For instance, some embodiments may include additional operations, omit listed operations, and/or perform the operations in different orders than described. As another example, the process (and/or portions thereof) may be performed iteratively, based on received user input, and/or other appropriate criteria.

III. Computer System

Many of the processes and modules described above may be implemented as software processes that are specified as one or more sets of instructions recorded on a non-transitory storage medium. When these instructions are executed by one or more computational element(s) (e.g., microprocessors, microcontrollers, digital signal processors (DSPs), application-specific integrated circuits (ASICs), field programmable gate arrays (FPGAs), etc.) the instructions cause the computational element(s) to perform actions specified in the instructions.

In some embodiments, various processes and modules described above may be implemented completely using electronic circuitry that may include various sets of devices or elements (e.g., sensors, logic gates, analog to digital converters, digital to analog converters, comparators, etc.). Such circuitry may be able to perform functions and/or features that may be associated with various software elements described throughout.

Figure 26:
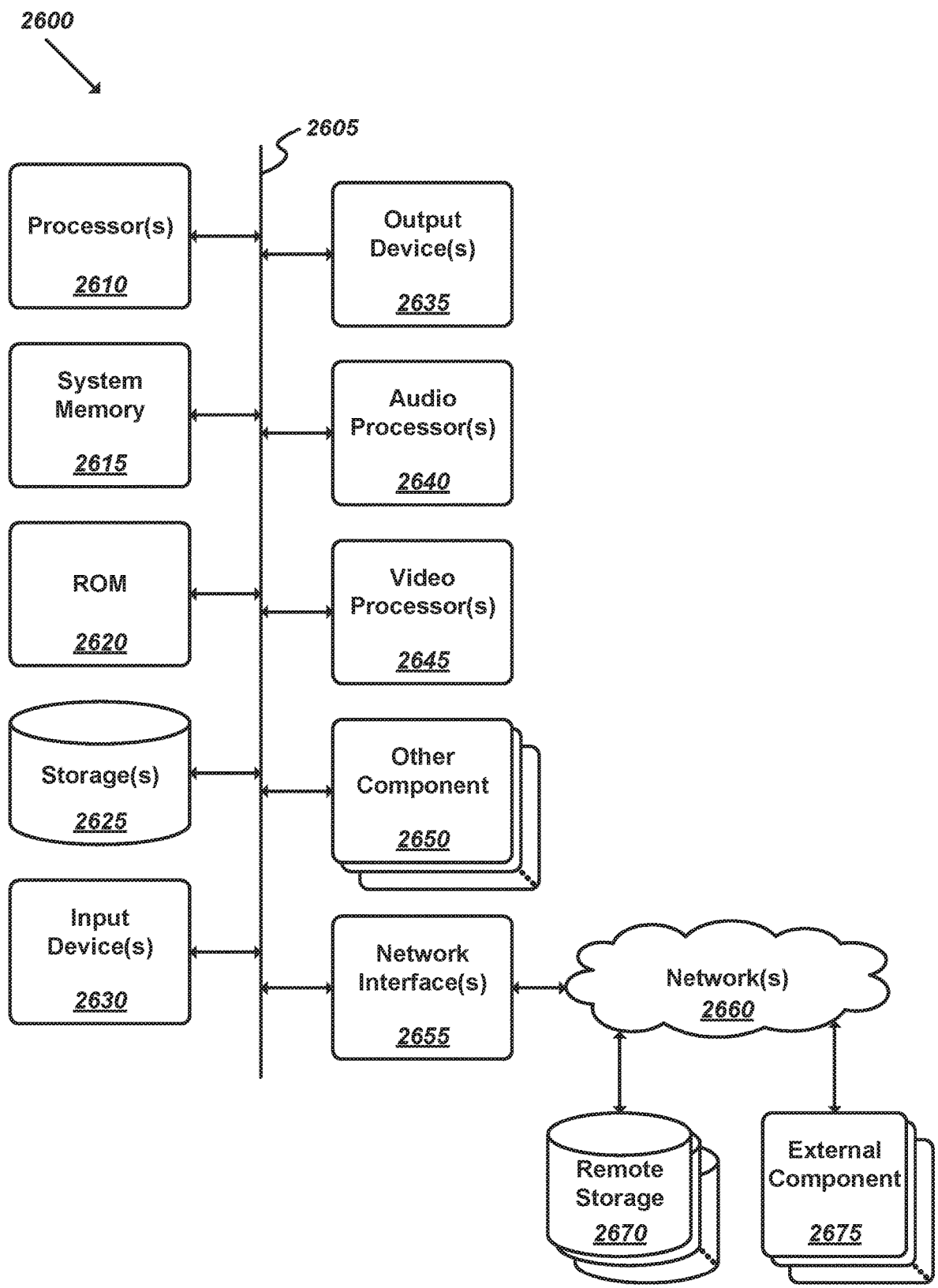
FIG. 26 illustrates a schematic block diagram of an exemplary computer system used to implement some embodiments.

FIG. 26 illustrates a schematic block diagram of an exemplary computer system 2600 used to implement some embodiments. For example, the system described above in reference to FIG. 1 may be at least partially implemented using computer system 2600. As another example, the processes described in reference to FIG. 22-FIG. 25 may be at least partially implemented using sets of instructions that are executed using computer system 2600.

Computer system 2600 may be implemented using various appropriate devices. For instance, the computer system may be implemented using one or more personal computers (PCs), servers, mobile devices (e.g., a smartphone), tablet devices, and/or any other appropriate devices. The various devices may work alone (e.g., the computer system may be implemented as a single PC) or in conjunction (e.g., some components of the computer system may be provided by a mobile device while other components are provided by a tablet device).

As shown, computer system 2600 may include at least one communication bus 2605, one or more processors 2610, a system memory 2615, a read-only memory (ROM) 2620, permanent storage devices 2625, input devices 2630, output devices 2635, audio processors 2640, video processors 2645, various other components 2650, and one or more network interfaces 2655.

Bus 2605 represents all communication pathways among the elements of computer system 2600. Such pathways may include wired, wireless, optical, and/or other appropriate communication pathways. For example, input devices 2630 and/or output devices 2635 may be coupled to the system 2600 using a wireless connection protocol or system.

The processor 2610 may, in order to execute the processes of some embodiments, retrieve instructions to execute and/or data to process from components such as system memory 2615, ROM 2620, and permanent storage device 2625. Such instructions and data may be passed over bus 2605.

System memory 2615 may be a volatile read-and-write memory, such as a random access memory (RAM). The system memory may store some of the instructions and data that the processor uses at runtime. The sets of instructions and/or data used to implement some embodiments may be stored in the system memory 2615, the permanent storage device 2625, and/or the read-only memory 2620. ROM 2620 may store static data and instructions that may be used by processor 2610 and/or other elements of the computer system.

Permanent storage device 2625 may be a read-and-write memory device. The permanent storage device may be a non-volatile memory unit that stores instructions and data even when computer system 2600 is off or unpowered. Computer system 2600 may use a removable storage device and/or a remote storage device as the permanent storage device.

Input devices 2630 may enable a user to communicate information to the computer system and/or manipulate various operations of the system. The input devices may include keyboards, cursor control devices, audio input devices and/or video input devices. Output devices 2635 may include printers, displays, audio devices, etc. Some or all of the input and/or output devices may be wirelessly or optically connected to the computer system 2600.

Audio processor 2640 may process and/or generate audio data and/or instructions. The audio processor may be able to receive audio data from an input device 2630 such as a microphone. The audio processor 2640 may be able to provide audio data to output devices 2640 such as a set of speakers. The audio data may include digital information and/or analog signals. The audio processor 2640 may be able to analyze and/or otherwise evaluate audio data (e.g., by determining qualities such as signal to noise ratio, dynamic range, etc.). In addition, the audio processor may perform various audio processing functions (e.g., equalization, compression, etc.).

The video processor 2645 (or graphics processing unit) may process and/or generate video data and/or instructions. The video processor may be able to receive video data from an input device 2630 such as a camera. The video processor 2645 may be able to provide video data to an output device 2640 such as a display. The video data may include digital information and/or analog signals. The video processor 2645 may be able to analyze and/or otherwise evaluate video data (e.g., by determining qualities such as resolution, frame rate, etc.). In addition, the video processor may perform various video processing functions (e.g., contrast adjustment or normalization, color adjustment, etc.). Furthermore, the video processor may be able to render graphic elements and/or video.

Other components 2650 may perform various other functions including providing storage, interfacing with external systems or components, etc.

Finally, as shown in FIG. 26, computer system 2600 may include one or more network interfaces 2655 that are able to connect to one or more networks 2660. For example, computer system 2600 may be coupled to a web server on the Internet such that a web browser executing on computer system 2600 may interact with the web server as a user interacts with an interface that operates in the web browser. Computer system 2600 may be able to access one or more remote storages 2670 and one or more external components 2675 through the network interface 2655 and network 2660. The network interface(s) 2655 may include one or more application programming interfaces (APIs) that may allow the computer system 2600 to access remote systems and/or storages and also may allow remote systems and/or storages to access computer system 2600 (or elements thereof).

As used in this specification and any claims of this application, the terms "computer", "server", "processor", and "memory" all refer to electronic devices. These terms exclude people or groups of people. As used in this specification and any claims of this application, the term "non-transitory storage medium" is entirely restricted to tangible, physical objects that store information in a form that is readable by electronic devices. These terms exclude any wireless or other ephemeral signals.

It should be recognized by one of ordinary skill in the art that any or all of the components of computer system 2600 may be used in conjunction with some embodiments. Moreover, one of ordinary skill in the art will appreciate that many other system configurations may also be used in conjunction with some embodiments or components of some embodiments.

In addition, while the examples shown may illustrate many individual modules as separate elements, one of ordinary skill in the art would recognize that these modules may be combined into a single functional block or element. One of ordinary skill in the art would also recognize that a single module may be divided into multiple modules.

The foregoing relates to illustrative details of exemplary embodiments and modifications may be made without departing from the scope of the disclosure as defined by the following claims.

We claim:

1. A cube puzzle solver comprising:
   at least one position sensing element, wherein the at least one position sensing element includes a moving portion and a static portion;
   at least one user interface (UI) output; and
   a controller that receives position information from the at least one position sensing element, determines a suggested move, and directs the at least one UI output to provide an indication associated with the suggested move.

2. The cube puzzle solver of claim 1, wherein the at least one UI output comprises a clockwise indicator and a counterclockwise indicator associated with each face of the cube puzzle solver.

3. The cube puzzle solver of claim 1 further comprising a communication interface that is able to communicate with a user device.

4. The cube puzzle solver of claim 1, wherein the at least one position sensing element comprises a relative position sensing element that is able to detect rotation of a face of the cube puzzle solver.

5. The cube puzzle solver of claim 1 further comprising a storage that is able to store a current state of the cube puzzle solver.

6. The cube puzzle solver of claim 1, wherein the moving portion comprises a circular disc that comprises conducting portions and non-conducting portions evenly spaced at forty-five degree intervals, and wherein the static portion comprises a circular disc that comprises conducting portions spaced at twenty-two and one half degree intervals.

7. The cube puzzle solver of claim 1, wherein the at least one UI output comprises a plurality of light emitting diodes (LEDs) arranged such that the plurality of LEDs may be activated in a first sequence to indicate clockwise rotation and a second sequence to indicate counterclockwise rotation.

8. A cube puzzle system comprising:
   a cube puzzle device comprising:
      a set of position sensing elements able to detect rotation of each face of the cube puzzle device, wherein each position sensing element in the set of position sensing elements includes a moving portion and a static portion; and
      a wireless communication interface; and
   a user device communicatively coupled to the cube puzzle solver over the wireless communication interface, the user device comprising:
      at least one user interface (UI) element that is able to provide step-by-step instructions to solve the cube puzzle device.

9. The cube puzzle system of claim 8, wherein the wireless communication interface comprises at least one of Bluetooth, Wi-Fi, optical, infrared, and ultrasonic.

10. The cube puzzle system of claim 8 further comprising a server that is able to communicate with the user device and the cube puzzle device.

11. The cube puzzle system of claim 10, wherein step-by-step instructions are sent to the cube puzzle device over the wireless communication interface from at least one of the user device and the server.

12. The cube puzzle system of claim 8, wherein the step-by-step instructions are provided via a three-dimensional rendering of the cube puzzle device.

13. The cube puzzle system of claim 8, wherein the cube puzzle device further comprises a set of UI elements that are able to provide the step-by-step instructions.

14. The cube puzzle system of claim 8, wherein the set of position sensing elements comprises a rotary sensing element that provides a two bit gray code output able to indicate changes in position of twenty-two and one half degree.

15. The cube puzzle system of claim 8, wherein a start time associated with a first state and a finish time associated with a second state are provided to the user device over the wireless interface.

16. An automated method of providing suggested moves for a cube puzzle solver comprising at least one position sensing element, at least one user interface (UI) output, and a controller, the method comprising:
   receiving, at the controller, from the at least one position sensing element, position information, wherein the at least one position sensing element includes a moving portion and a static portion;
   determining, at the controller, a suggested move; and
   directing the at least one UI output to provide an indication associated with the suggested move.

17. The automated method of claim 16, wherein determining, at the controller, a suggested move, comprises:
   monitoring a set of sense pins;

identifying rotation based on a change in state of at least one sense pin in the set of sense pins;

identifying a face of the cube puzzle solver associated with the identified rotation; and updating a state of the cube puzzle solver based on the identified face and the identified rotation.

18. The automated method of claim 17, wherein the set of sense pins comprises two sense pins, and a gray code associated with the outputs of the two sense pins is able to detect rotation in twenty-two and one half degree increments over each ninety degrees of rotation and the cube puzzle solver is in a low power state at square positions.

19. The automated method of claim 17, wherein identifying the face of the cube puzzle solver comprises:

monitoring the set of sense pins;

activating a particular face of the cube puzzle; and determining whether the particular face is associated with the identified rotation.

20. The automated method of claim 17, wherein each face of the cube puzzle solver comprises a plurality of sub-elements and the state of the cube puzzle solver comprises a position for each sub-element.

21. The automated method of claim 17, further comprising identifying a solution based on the state of the cube puzzle solver.

22. The automated method of claim 17, wherein the cube puzzle solver is in a low power state at square positions.

23. The automated method of claim 22, wherein directing the at least one UI output to provide an indication associated with the suggested move comprises activating a particular user interface element associated with a particular face of the cube puzzle solver.

* * * * *